United States Patent
DeRoche et al.

(10) Patent No.: US 7,008,146 B2
(45) Date of Patent: Mar. 7, 2006

(54) MILLING CUTTER WITH TANGENTIALLY MOUNTED INSERTS

(75) Inventors: Kenneth G. DeRoche, Latrobe, PA (US); Mark A. Francis, Solon, OH (US)

(73) Assignee: Kennametal Inc., Latrobe, PA (US)

( * ) Notice: Subject to any disclaimer, the term of this patent is extended or adjusted under 35 U.S.C. 154(b) by 0 days.

(21) Appl. No.: 10/623,844

(22) Filed: Jul. 21, 2003

(65) Prior Publication Data

US 2005/0019109 A1    Jan. 27, 2005

(51) Int. Cl.
*B23B 27/16*    (2006.01)
(52) U.S. Cl. .......................... 407/42; 407/114; 407/35
(58) Field of Classification Search .................. 407/44, 407/42, 61, 62, 66, 114
See application file for complete search history.

(56) References Cited

U.S. PATENT DOCUMENTS

| | | | |
|---|---|---|---|
| 3,701,187 A | 10/1972 | Erkfritz | |
| 3,708,843 A | 1/1973 | Erkfritz | |
| 4,294,565 A | 10/1981 | Erkfritz | |
| 4,597,695 A | 7/1986 | Johnson | |
| 4,692,070 A | 9/1987 | Shikata | |
| 4,790,693 A * | 12/1988 | Koblesky | 407/35 |
| 4,940,369 A * | 7/1990 | Aebi et al. | 407/42 |
| 4,946,318 A * | 8/1990 | David et al. | 407/42 |
| 5,035,546 A | 7/1991 | Pawlik | |
| 5,078,550 A | 1/1992 | Satran et al. | |
| 5,114,282 A | 5/1992 | Pawlik | |
| 5,209,611 A | 5/1993 | Drescher | |
| 5,333,972 A * | 8/1994 | Bernadic et al. | 407/113 |
| 5,658,100 A | 8/1997 | Deiss et al. | |
| 5,676,505 A | 10/1997 | Gauss et al. | |
| 5,704,736 A | 1/1998 | Giannetti | |
| 5,741,095 A | 4/1998 | Charron et al. | |
| 5,788,427 A | 8/1998 | Zitzlaff et al. | |
| 5,876,160 A | 3/1999 | Johnson | |
| 5,911,548 A | 6/1999 | Deiss et al. | |
| 5,924,824 A | 7/1999 | Satran et al. | |
| 5,957,633 A | 9/1999 | Hall | |
| 5,957,755 A | 9/1999 | LaFlamme | |
| 6,053,673 A | 4/2000 | Swift et al. | |

(Continued)

FOREIGN PATENT DOCUMENTS

DE    811 177    7/1949

(Continued)

*Primary Examiner*—Willmon Fridie, Jr.
(74) *Attorney, Agent, or Firm*—Larry R. Meenan (57) ABSTRACT

A milling cutter with tangentially mounted cutting inserts includes cutter pockets that are arranged at one end of the cutter body such that the screws for retaining the inserts generally radiate from the cutter's center. The cutter pockets are designed to secure a generally rectangular insert with eight or less cutting edges. The number of inserts and corresponding flutes vary as a function of the diameter of the cutter body. For example, four inserts with corresponding flutes are mounted on a 1.25" diameter cutter body, and three inserts with corresponding flutes are mounted on a 1.00" diameter cutter body. The increased number of flutes provide for increased metal removal rates and higher feed rates, as compared to an inserted ball nose mill or end mill. The cutter pockets are angled such that there is sufficient clearance under the insert cutting edges and present a "reverse lead" so the cutter assembly can produce a slightly undercut profile on the workpiece, or fixturing of almost five degrees so the radius generated on the workpiece can be nearly the same as that generated by a ball nose mill. The cutting inserts include facets for generating very good surface finishes on the workpiece.

19 Claims, 7 Drawing Sheets

U.S. PATENT DOCUMENTS

| | | |
|---|---|---|
| 6,171,031 B1 | 1/2001 | LaFlamme |
| 6,190,096 B1 | 2/2001 | Arthur |
| 6,203,251 B1 | 3/2001 | Oppelt et al. |
| 6,217,263 B1 | 4/2001 | Wiman et al. |
| 6,227,772 B1 | 5/2001 | Heinloth et al. |
| 6,238,146 B1 | 5/2001 | Satran et al. |
| 6,488,450 B1 * | 12/2002 | Norris .................. 407/35 |

FOREIGN PATENT DOCUMENTS

| | | |
|---|---|---|
| DE | 2 258 448 | 8/1973 |
| DE | 3624861 A1 | 7/1986 |
| DE | 37 25 154 A1 | 2/1988 |
| EP | 1097017 B1 | 5/2001 |

* cited by examiner

MILLING CUTTER WITH TANGENTIALLY MOUNTED INSERTS

BACKGROUND OF THE INVENTION

1. Field of the Invention

This invention relates to an indexable inserted milling tool. More particularly, this invention relates to a milling cutter with tangentially mounted indexable cutting inserts.

2. Description of the Related Art

In the process of milling turbine blades or "buckets", one generally finds in use solid carbide end mills (SCEM), inserted carbide end mills (ICEM), and insert face mills for roughing only. Ball nose end mills (solid and inserted) are used for semi-finishing and in some case, finishing. The cutter paths programmed are typically radial or axial with regard to the blade form. In either case, there are axes of rotation on both the blade and the cutter, with additional axes used to produce large concave and convex surfaces. The paths are followed for as long as it takes to reduce either a block of material or a near-net shaped forging to its intended size and shape. The type of cutting tool used is generally dictated by the condition of the workpiece at the start of the process, and the capabilities of the machine. In both cases, the semi-finishing and finishing cuts are addressed by smaller diameter tools due to the radii of the turbine blade surfaces.

Axial cutter paths have been used on several types of single and multi-spindle NC and CNC machines. The path is basically one that travels across the front and back sides of the blade with cutting taking place across an edge of the blade between the cutting of two sides. The path includes the convex and concave surfaces, which change rather quickly as the progression of the tool makes its way around the blade, and slowly progresses from one end of the blade to the other.

Basically, radial paths travel from root or base to tenon or blade tip until the front or back of the blade is cut to depth. The path then moves along the leading or trailing edge to cut to the desired depth, and continues to the uncut front or back of the blade to finish removing material in the same manner as the opposite. This process has traditionally been accomplished with what is called a "Hydrotel" machine, which uses a dovetail-shaped cutter with round inserts. These multi-spindle machines are quickly becoming antiquated, spending on maintenance and refurbishing is drastically reduced, and the owners are opting for new CNC machines. Lately, machinists have found that the radial cutting path is more cost effective, and the ability to reduce or eliminate secondary finishing operations is obtainable with creative programming and tooling. This includes, but is not limited to, the tilting of the milling machine's spindle, or the workpiece such that a ball-nosed tool will not cut with the surfaces of the tool that have minimal effective speeds and feeds.

SUMMARY OF THE INVENTION

Briefly, according to this invention, there is provided a milling cutter tool comprising a milling cutter body having a plurality of insert receiving pockets, in combination with an indexable cutting insert tangentially mounted in the insert pocket. Each cutting insert comprises a body defined by first and second face surfaces, first and second long edge surfaces, and first and second radiused shorter edge surfaces, wherein each indexable cutting insert is tangentially mounted with a reverse lead angle. Each long edge surface defines a cutting face that includes a profile defined by a substantially flat central plateau, a first facet face, a second facet face and a third facet face.

BRIEF DESCRIPTION OF THE DRAWINGS

Further features of the present invention, as well as the advantages derived therefrom, will become clear from the following detailed description made with reference to the drawings in which.

DESCRIPTION OF THE PREFERRED EMBODIMENT

Referring to the drawings, wherein like reference characters represent like elements, a cutting insert, shown generally at 10, is shown according to the present invention in FIGS. 1–4. The cutting insert 10 is indexable about an axis of rotational symmetry, A, so that the cutting insert 10 has eight edges capable of functioning as effective cutting edges. The cutting insert 10 is capable of being used in a wide range of different cutting operations.

Figure 1:
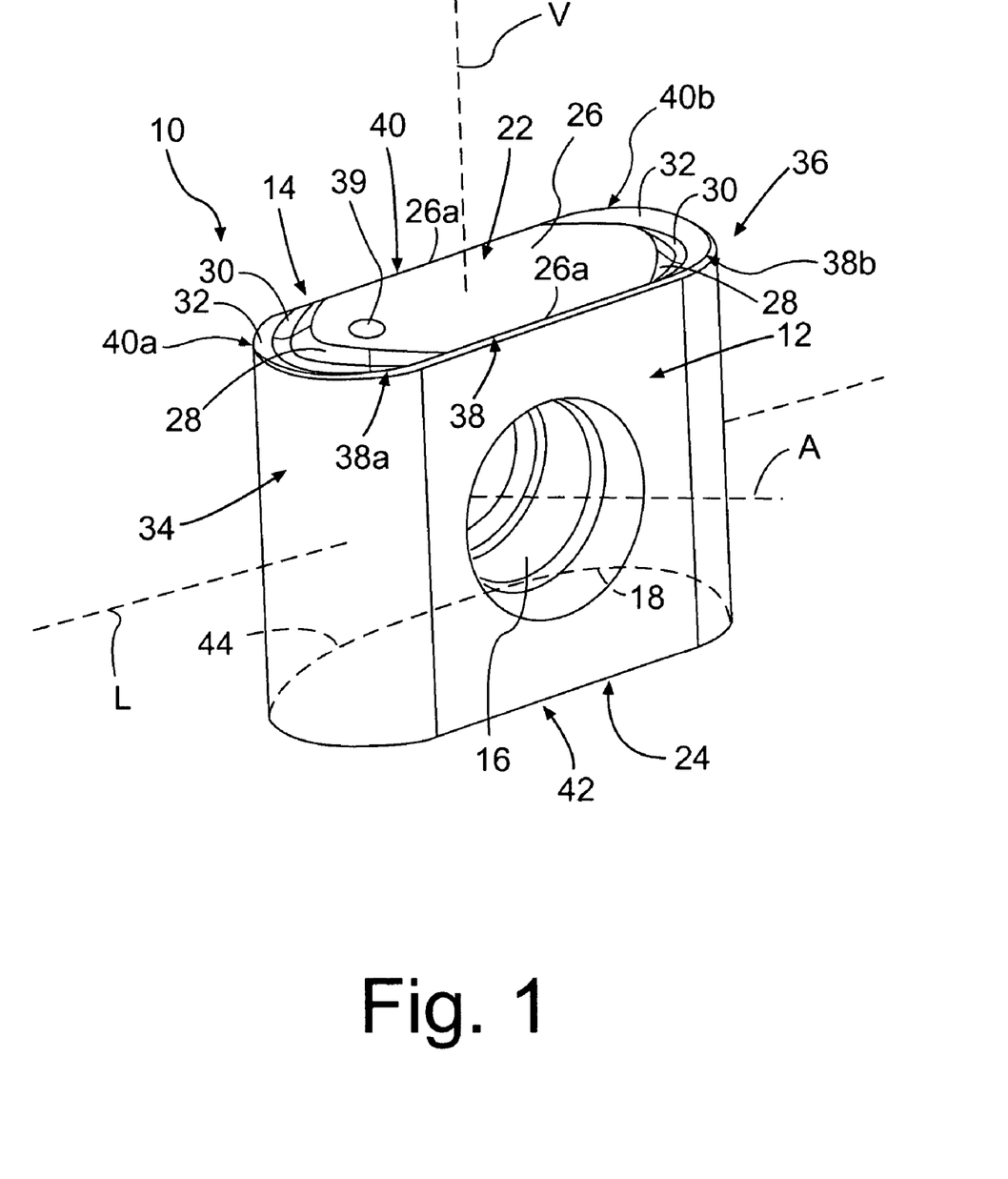
FIG. 1 shows a perspective view of a cutting insert according to the present invention.

As seen in FIG. 1, the cutting insert 10 includes a body formed of a suitable cutting material and is defined by first and second planar face surfaces 12, 14 disposed in substantially parallel planes. For purposes of convenience, the first and second face surfaces 12, 14 will be referred to as upper and lower face surfaces 12, 14, respectively. The cutting insert 10 includes a clamping screw bore 16 having a longitudinal axis coinciding with the axis of symmetry, A, and extending between the first and second planar face surfaces 12, 14. The clamping screw bore 16 may include a pair of counter sinks 18 shaped as a part of a torus or a cone to receive a countersunk head screw 20 or any other fastening means, such as a pinlock or the like, to enable the screw 20 to lie slightly below the face surfaces 12, 14.

Figure 2:
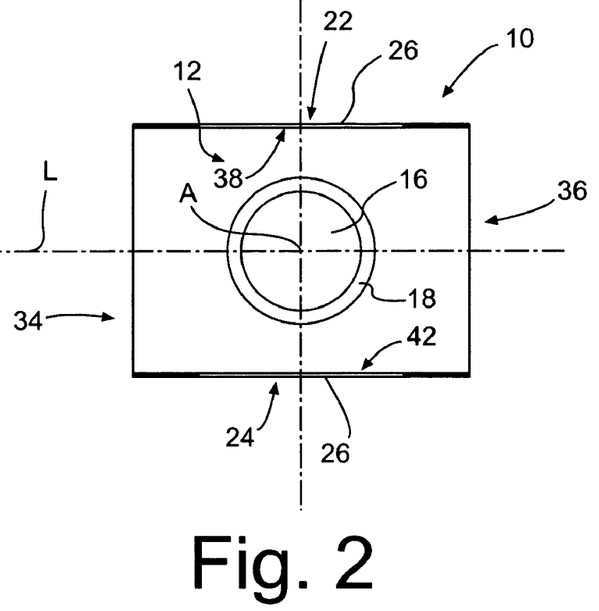
FIG. 2 shows a front elevational view of the cutting insert of FIG. 1.
Figure 3:
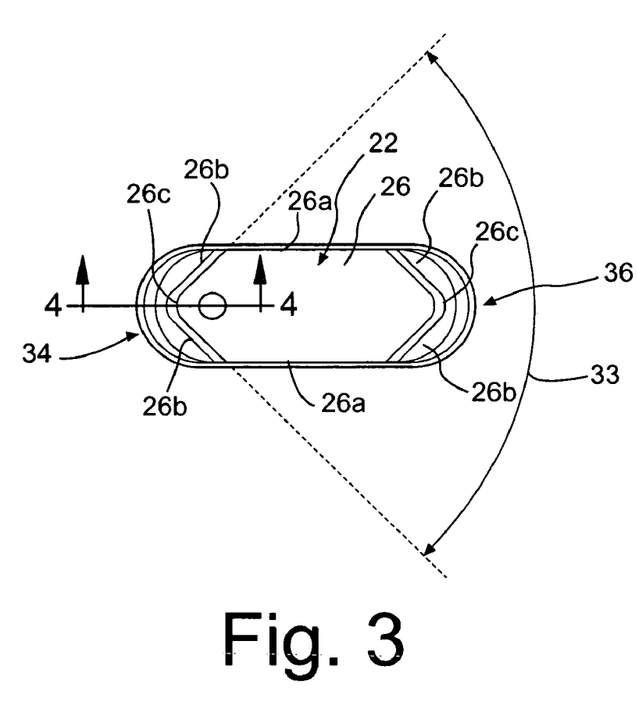
FIG. 3 shows a top view of the cutting insert of FIG. 1.
Figure 4:
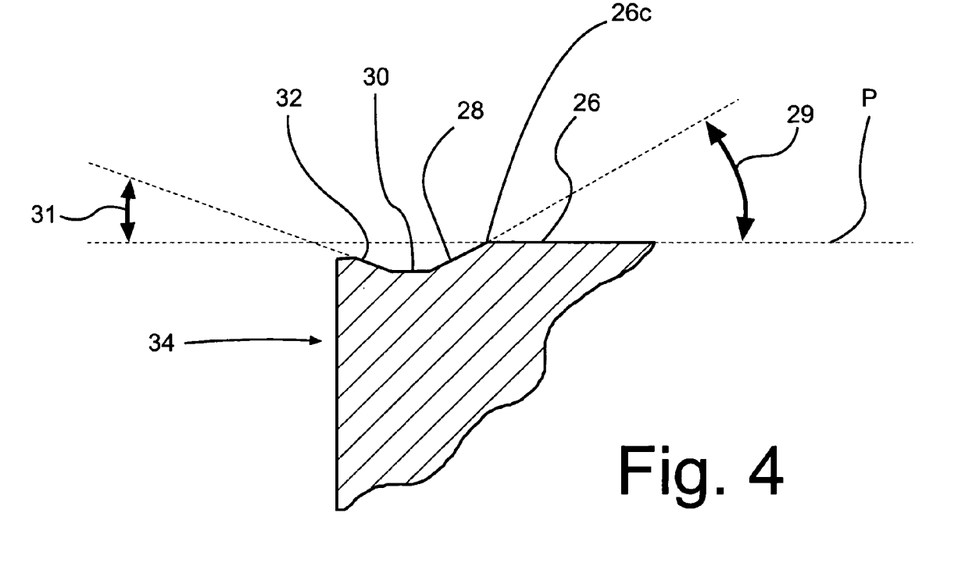
FIG. 4 shows a cross sectional view of the cutting insert taken along line 4—4 of FIG. 3.
Figure 5:
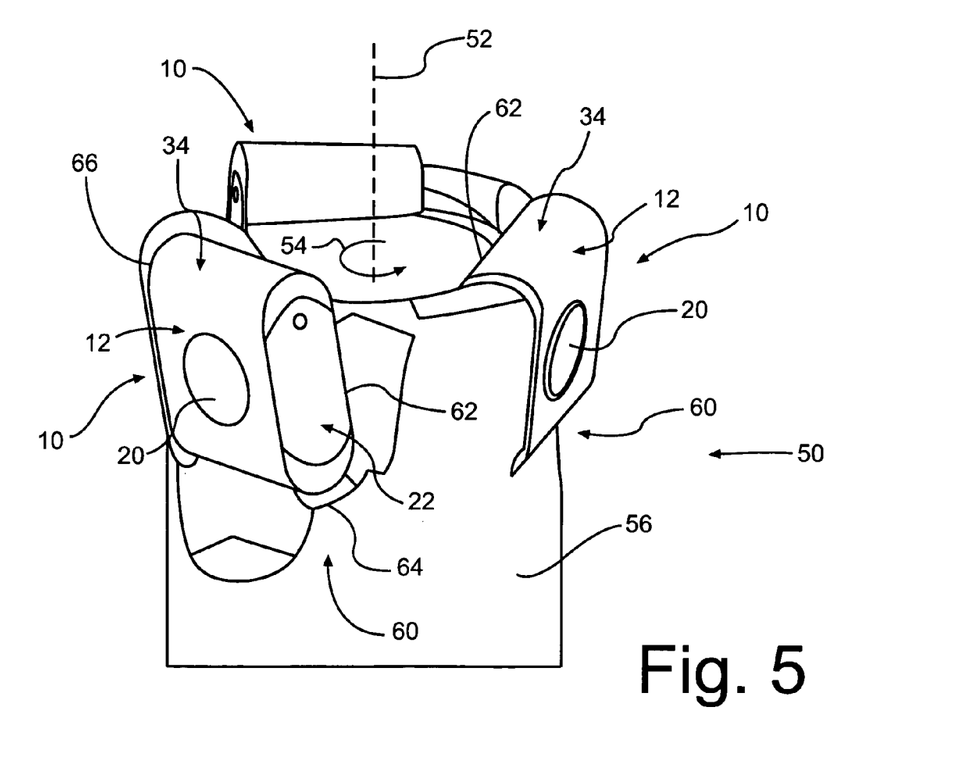
FIG. 5 shows a perspective view of a typical milling cutter having three new and improved cutting inserts of FIG. 1 seated in their respective insert receiving pockets in accordance with the invention.

Referring now to FIGS. 2–4, the cutting insert 10 is defined by first and second edge surfaces 22, 24, which define cutting faces that extend between the long sides of the face surfaces 12, 14. For purposes of convenience, the first and second edge surfaces 22, 24 will be referred to long edge surfaces 22, 24. Because the cutting insert 10 is symmetric about a longitudinal axis, L, some of the discussion for the long edge surface 24 may be omitted for brevity. Each long edge surface 22, 24 defines a cutting face that includes a profile defined by a substantially flat central plateau 26 that is substantially parallel to a plane, P. Each long edge surface 22, 24 also includes a first facet face 28 having a downward angle 29 in the range of approximately 5° to 45°, for example, approximately 30° with respect to the plane, P, a second facet face 30 that is substantially parallel to the plane, P, and a third facet face 32 having an upward angle 31 in the range of approximately 5° to 45°, for example, approximately 20° with respect to the plane, P. It should be noted that the plane, P, is substantially parallel to the longitudinal axis, L, of the cutting insert 10.

As shown in FIG. 2, the central plateau 26 may have a slightly higher elevation than the face surfaces 12, 14 and is generally hexagonal in shape (as viewed in FIG. 3) that includes a pair of opposite sides 26a and two pair of angled sides 26b to form a pair of radiused corners 26c. The angled sides 26b of the central plateau 26 form an acute angle 33 of approximately 80° with respect to each other. The facet faces 28, 30 and 32 provide for effective chip control. However, it will be appreciated that the invention is not limited by the number of facet faces or the angles of the facet faces, and that the invention can be practiced with any desirable number of facet faces with angles that provide effective chip control.

The primary cutting edge for a given index of the cutting insert 10 extends from section line 4—4 (or apex of the radius) to the intersection of the shorter radiused edge surface 34 and the angled sides 26b, as shown in FIG. 3. The cutting edge 28a will cut, but is not intended for such cutting in the illustrated example of the invention. In order for the cutting edge 28a to cut effectively, the cutting insert design would need the chip control to extend along that portion of the cutting insert 10. Thus, the focus of cutting edges that can effectively cut should be constrained to the radius edges for cutting to somewhat shallow depths, as is the typical process for low power CNC milling machines in certain industries, for example, the turbine blade machining industry.

The cutting insert 10 is also defined by first and second radiused edge surfaces 34, 36 that extend between the shorter sides of the face surfaces 12, 14. For purposes of convenience, the first and second edge surfaces 34, 36 will be referred to as shorter radiused edge surfaces 34, 36. A first cutting edge 38 is defined along the intersection of the long edge surface 22 with the upper face surface 12 and along the intersection of the long edge surface 22 with the shorter radiused edge surface 34. A second cutting edge 40 is defined along the intersection of the long edge surface 22 with the lower face surface 14 and along the intersection of the long edge surface 22 with the shorter radiused edge surface 36. Because the insert 10 is symmetric about the longitudinal axis, L, a third cutting edge 42 is defined along the intersection of the long edge surface 24 with the upper face surface 12 and along the intersection of the long edge surface 24 with the shorter radiused edge surface 34. A fourth cutting edge 44 (shown in phantom in FIG. 1) is defined along the intersection of the long edge surface 24 with the lower face surface 14 and along the intersection of the long edge surface 24 with the shorter radiused edge surface 36. When one cutting edge becomes worn, the insert 10 may be indexed 180° about the axis, A, of the clamping screw bore 16 to bring the other cutting edge on the same face surface 12, 14 into active cutting position. In addition, the insert 10 can be indexed 180° about a vertical axis, V, to bring the other cutting edge on the other face surface 12, 14 into active cutting position. The insert 10 may include a locating dimple 39 for assisting in the positioning of the insert 10 in the cutting tool.

Figure 6:
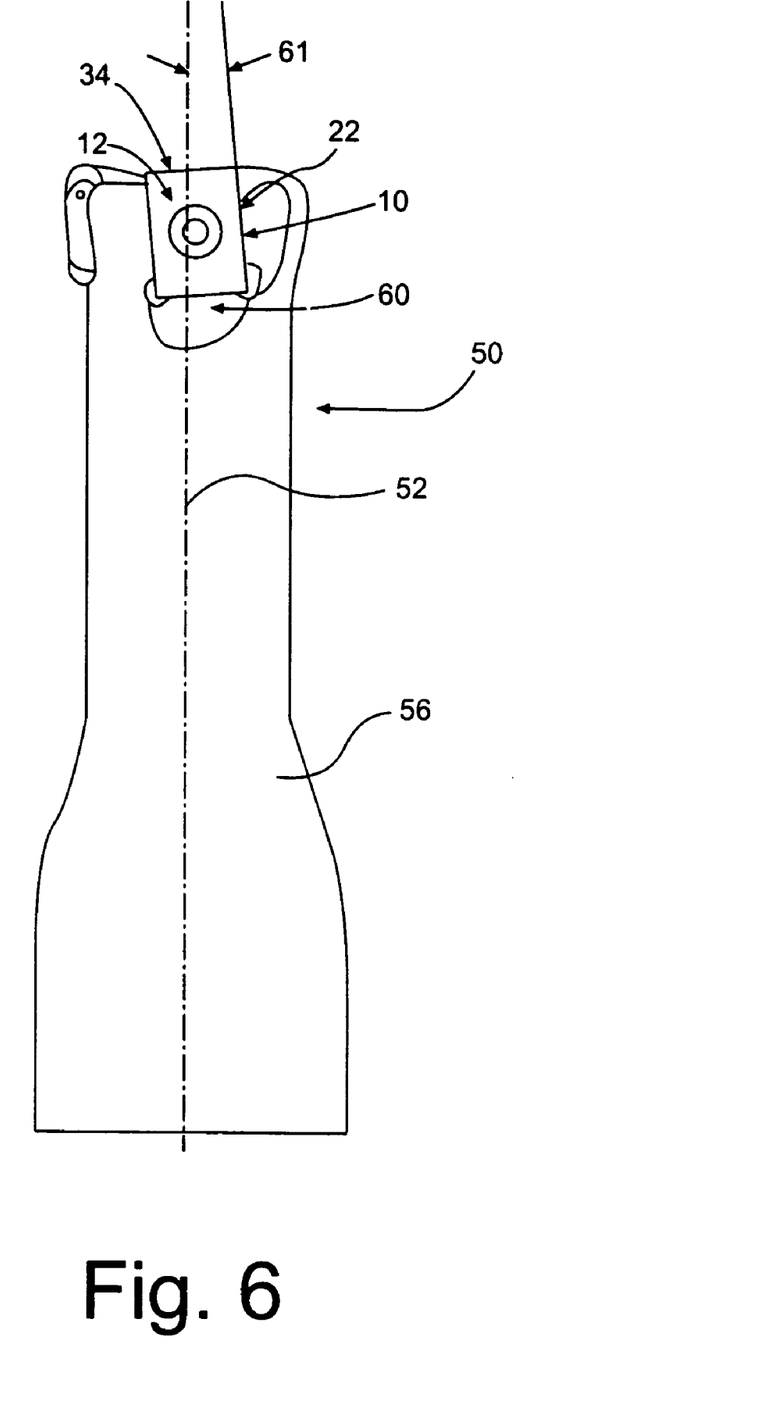
FIG. 6 shows a partial side elevational view of the milling cutter showing the negative axial rake angle of the cutting insert of FIG. 1 when mounted in the milling cutter of FIG. 5.
Figure 9:
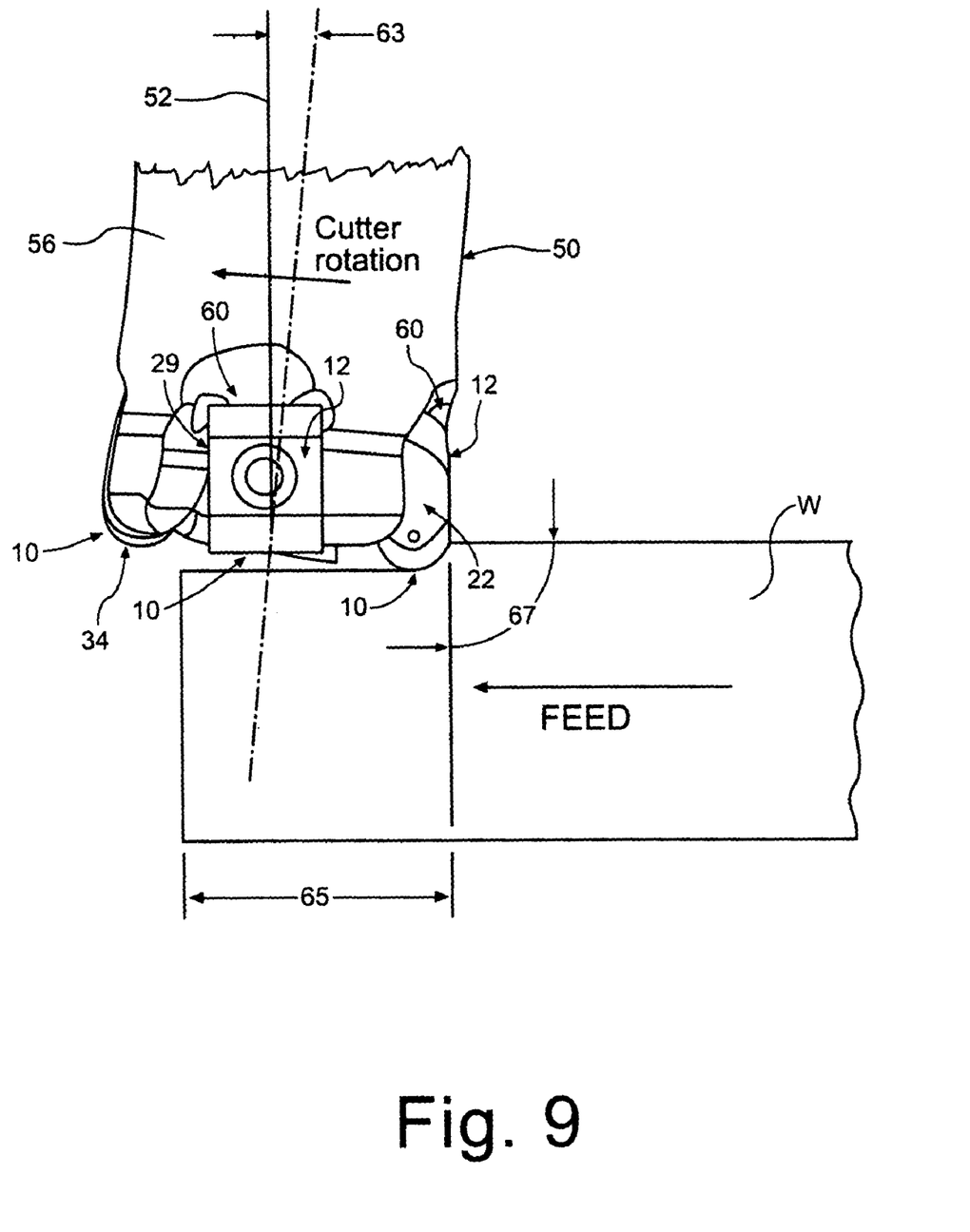
FIG. 9 shows a schematic side view of three cutting inserts of FIG. 1 seated in their respective insert receiving pockets and engaging a workpiece in accordance with the invention.

Referring now to FIGS. 5–9, an end milling cutter, shown generally at 50, rotatable about a central axis 52 in the direction of the arrow 54 is adapted to receive three cutting inserts 10. The milling cutter 50 includes a cylindrical metal body 56 having a shank 58 at its inner end and formed with three angularly spaced insert receiving pockets 60. In one aspect of the invention, the inserts 10 are angled so as to present a negative axial rake angle 61 of approximately 5° to facilitate chip formation and removal from the workpiece, W, as shown in FIGS. 6 and 9. However, it will be appreciated that the invention is not limited by the magnitude of the negative axial rake angle, and that the invention can be practiced with any desirable negative axial or radial rake angle.

Figure 7:
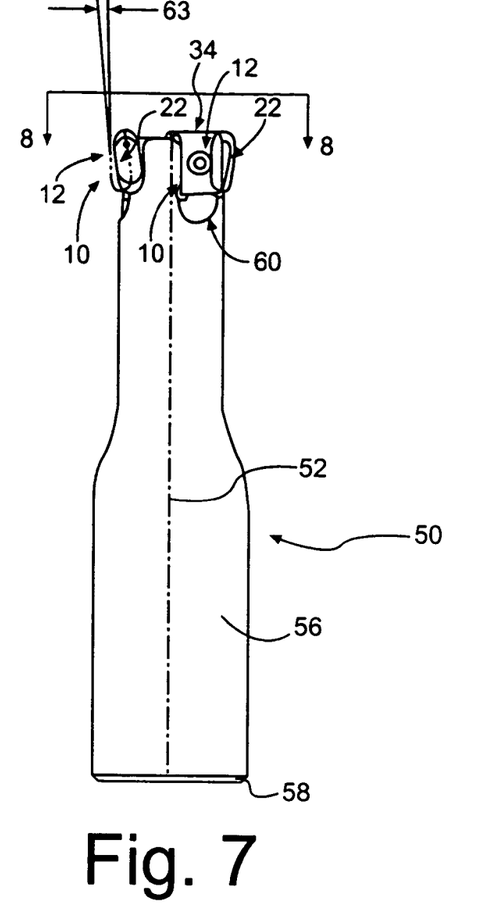
FIG. 7 shows another side elevational view of the milling cutter showing the "reverse lead" angle of the cutting insert of FIG. 1 when mounted in the milling cutter of FIG. 5.
Figure 8:
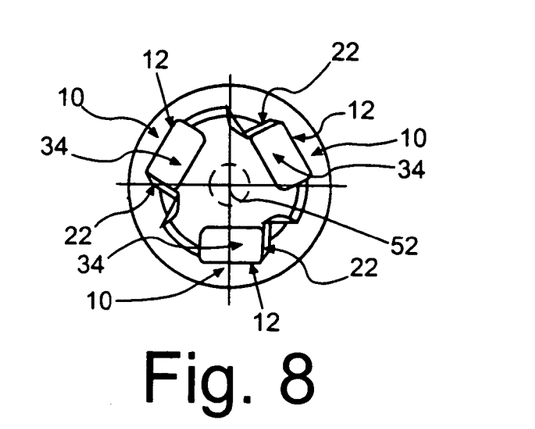
FIG. 8 shows an end view of the cutter taken along line 8—8 of FIG. 7.

Each pocket 60 includes a platform 62 upon which the insert 10 is seated. The platform 62 is angled such that the insert 10 presents a "reverse lead" angle 63 in assembly, an (ANSI) lead angle 65, or an (ISO) lead angle 67 on the workpiece, W (FIG. 9). In the illustrated embodiment using a progressive process, the machine's spindle or workpiece is tilted approximately 5° such that the cutting insert 10 presents a zero degree (ANSI) angle 65, or ninety degree (ISO) lead angle 67, as shown in FIGS. 7 and 9. The reverse lead angle 63 ensures that a tool, such as a ball-nosed tool, does not cut with the end of the tool where the cutting speed and feed rate is essentially zero. In the illustrated embodiment, the milling cutter 50 having about a 1.00 inch diameter produces an elliptical cut having an ellipse with a 0.442 inch semi major axis and a 0.043 inch semi minor axis. It will be appreciated that the dimensions of the cutting insert 10 can vary depending on design of the tool. For example, the radius of the cutting insert 10 can be used to determine the size of the insert, the size of the cutter, the axial depth of the cut, as well as the ellipse for metal cutting productivity.

In addition, the reverse lead angle 63 provides for the insert 10 to present additional cutting edges to the workpiece, W. For example, when the insert 10 is mounted such that the upper face surface 12 is facing outwardly, the reverse lead angle 63 causes the first cutting edge 38 to be further defined by two cutting edges 38a, 38b defined by the intersection of the long edge surface 22 with the upper face surface 12 and the intersection of the long edge surface 22 with the short edge surfaces 34, 36 that are adjacent the upper face surface 12. Similarly, when the insert 10 is mounted such that the lower face surface 14 is facing outwardly, the reverse lead angle 63 causes the second cutting edge 40 to be further defined by two cutting edges 40a, 40b defined by the intersection of the long edge surface 22 with the lower face surface 14 and the intersection of the long edge surface 22 with the short edge surfaces 34, 36 that are adjacent the lower face surface 14. Likewise, the third and fourth cutting edges 42, 44 have additional cutting edges because the insert 10 is mounted with the reverse lead angle 63 of the invention. Thus, the insert 10 of the invention has a total of eight cutting edges, as compared to an insert with four cutting edges that is mounted with a lead angle of zero degrees. As a result, the insert 10 of the invention is more economical to use than a conventional insert that is mounted with a lead angle of zero degrees.

Each pocket 60 further includes two substantially flat and planar locating abutments 64, 66 disposed adjacent the inner and trailing sides, respectively, of the pocket 60. Each insert 10 is mounted in the pocket 60 by threading the clamping screw 20 into the clamping screw bore 16 and into a tapped bore (not shown) in the platform 62.

In operation, a portion of the cutting edges 38a, 38b, 40a, 40b that are defined by the intersection of the cuttting edge surfaces 38, 40 and the upper and lower surfaces 12, 14, respectively, provide for a full radiused cutting edge which is relatively large at the cutting edge itself. By virtue of the full radiused cutting edge, the insert 10 with the two radiused ends may effectively span the gap between two spaced inserts of an adjacent row. The strength of the cutting edges 38a, 38b, 40a, 40b (and 42a, 42b, 44a, 44b) are increased by forming the radiused corners on these cutting edges.

Figure 10:
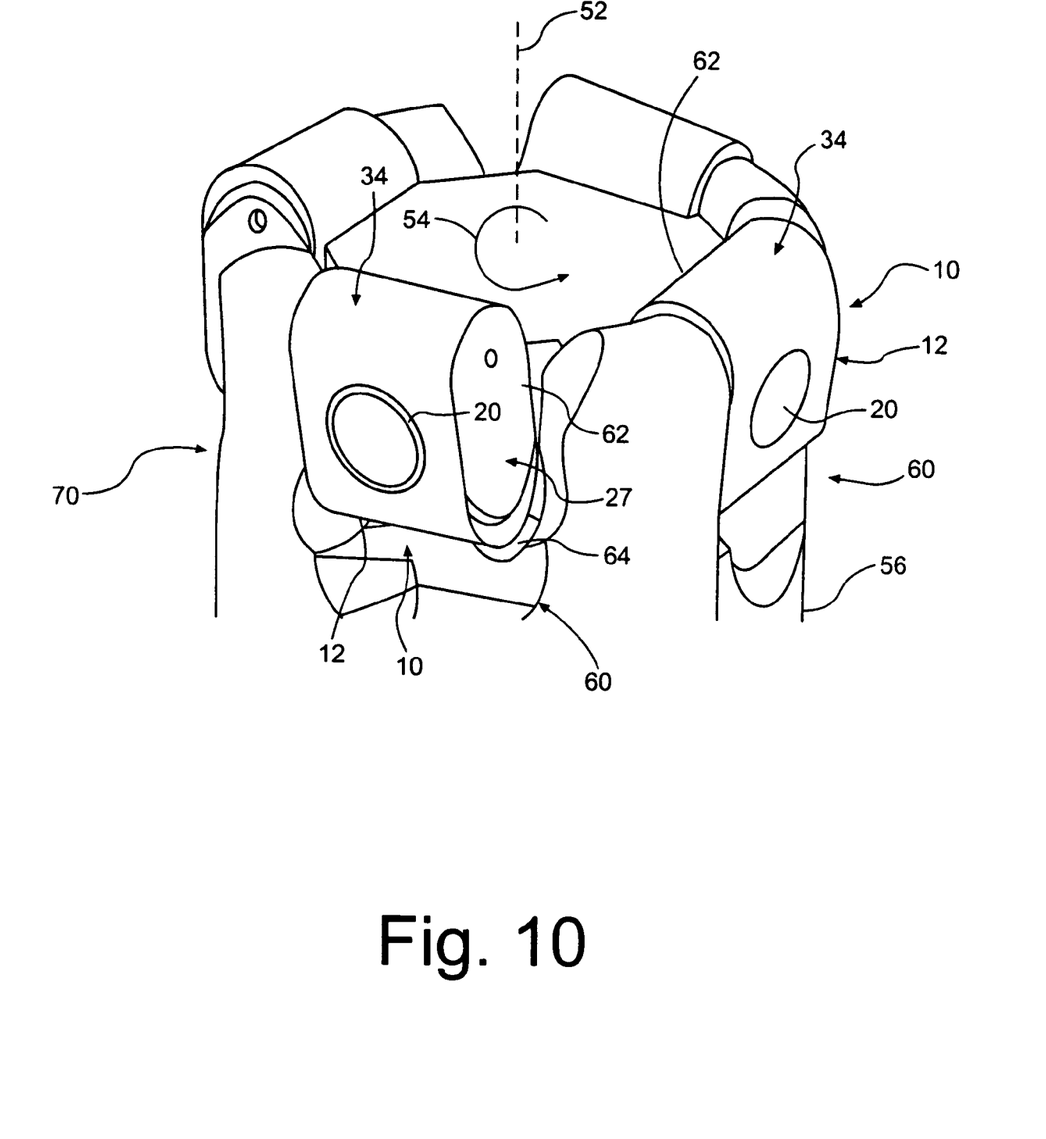
FIG. 10 shows a perspective view of another typical milling cutter having four new and improved cutting inserts of FIG. 1 seated in their respective insert receiving pockets in accordance with the invention.

The milling cutter 50 with three improved cutting inserts 10 of the present invention circumferentially mounted approximately 120° with respect to each other has a diameter of about 1.00 inches. However, the principles of the present invention can be implemented with any desirable milling cutter as is only limited by its diameter. For example, as shown in FIG. 10, the invention can be practiced with a milling cutter, shown generally at 70, having a diameter of about 1.25 inches, rather than a diameter of about 1.00 inches. The larger diameter of the milling cutter 70 allows for four improved cutting inserts 10 to be circumferentially mounted at approximately 90° with respect to each other. The larger diameter milling cutter 70 with an approximately 5 degree "reverse lead" angle 63 and a negative axial rake angle 61 of approximately 5° provides an elliptical cut having an ellipse with a 0.545 semi major axis and a 0.054 semi minor axis. Thus, the elliptical cut produced by the cutting inserts 10 mounted on the milling cutter of the invention is a function of the radius of the cutting insert 10. Thus, the milling cutter of the invention can produce any desired elliptical cut by varying the radius of the cutting insert 10, and/or the axial and radial rakes.

In light of the foregoing, it will be apparent that the present invention bring to the art a new and improved on-edge indexable insert 10 in which a "reverse lead" angle 63 provides a milling cutter that can produce a slightly undercut profile on the workpiece if desired (i.e., at the root of a blade), while providing for twice the cutting edges when compared to conventionally mounted inserts. In addition, the indexable insert 10 of the present invention possesses cutting edges that have a greater effective length and greater strength when compared with inserts that are radiused in a conventional manner.

The documents, patents and patent applications referred to herein are hereby incorporated by reference.

While the invention has been specifically described in connection with various embodiments thereof, it is to be understood that this is by way of illustration and not of limitation, and the scope of the appended claims should be construed as broadly as the prior art will permit.

What is claimed is:

1. A milling cutter tool, comprising:
    a milling cutter body having a plurality of insert pockets, in combination with an indexable cutting insert tangentially mounted in the insert pocket, each cutting insert comprising a body defined by first and second face surfaces, first and second long edge surfaces, and first and second radiused shorter edge surfaces, wherein each long edge surface defines a primary cutting edge that extends from a substantially flat central plateau, through a first facet face, through a second facet face adjacent the first facet face, through a third facet face adjacent the second facet face to one of the first and second radiused shorter edge surfaces such that the second facet is disposed between the first facet face and the third facet face.

2. The milling cutter tool according to claim 1, wherein the cutting insert is mounted with a reverse lead angle.

3. The milling cutter tool according to claim 1, wherein each indexable cutting insert is tangentially mounted with a negative axial rake angle of approximately 5 degrees.

4. The milling cutter tool according to claim 1, wherein the first facet face has a downward angle in a range of apporximately 5 degrees to 45 degrees with respect to a longitudinal axis of the cutting insert.

5. The milling cutter tool according to claim 4, wherein the downward angle is approximately 30 degrees with respect to the longitudinal axis of the cutting insert.

6. The milling cutter tool according to claim 4, wherein the third facet face has a upward angle in a range of approximately 5 degrees to 45 degrees with respect to a longitudinal axis of the cutting insert.

7. The milling cutter tool according to claim 6, wherein the upward angle is approximately 20 degrees with respect to the longitudinal axis of the cutting insert.

8. The milling cutter tool according to claim 4, wherein the central plateau is generally hexagonal in shape that includes a pair of opposite sides and two pair of angled sides.

9. The milling cutter tool according to claim 1, wherein a cutting edge is defined along an intersection of one of the first and second face surfaces with one of the first and second long edge surfaces and one of first and second shorter radiused edge surfaces.

10. The milling cutter tool according to claim 9, wherein the cutting edge is further defined by a pair of cutting edges defined by an intersection of the first long edge surface with the first face surface and an intersection of the first long edge surface with the first shorter radiused edge surface adjacent the first face surface.

11. A tangentially mounted indexable cutting insert for a milling cutter tool, comprising:
    a body defined by first and second face surfaces;
    first and second long edge surfaces; and
    first and second radiused shorter edge surfaces,
    wherein each long edge surface defines a primary cutting edge that extends from a substantially flat central plateau, through a first facet face, through a second facet face adjacent the first facet face, through a third facet face adjacent the second facet face to one of the first and second radiused shorter edge surfaces such that the second facet face is disposed between the first facet and the third facet face.

12. The cutting insert according to claim 11, wherein the first facet face has a downward angle in a range of approximately 5 degrees to 45 degrees with respect to a longitudinal axis of the cutting insert.

13. The cutting insert according to claim 12, wherein the downward angle is approximately 30 degrees with respect to the longitudinal axis of the cutting insert.

14. The cutting insert according to claim 11, wherein the third facet face has an upward angle in a range of approximately 5 degrees to 45 degrees with respect to a longitudinal axis of the cutting insert.

15. The cutting insert according to claim 14, wherein the upward angle is approximately 20 degrees with respect to a longitudinal axis of the cutting insert.

16. The cutting insert according to claim 11, wherein the central plateau is generally hexagonal in shape that includes a pair of opposite sides and two pair of angled sides.

17. The cutting insert according to claim 11, wherein the cutting insert is tangentially mounted with a reverse lead angle.

18. The cutting insert according to claim 17, wherein the reverse lead angle is approximately 5 degrees.

19. The cutting insert according to claim 11, wherein each indexable cutting insert is tangentially mounted to the milling cutter tool with a negative axial rake angle of approximately 5 degrees.

* * * * *